Dec. 12, 1961  R. B. SPOONER  3,012,957
POWER PRODUCTION SYSTEM
Filed June 10, 1959  2 Sheets-Sheet 1
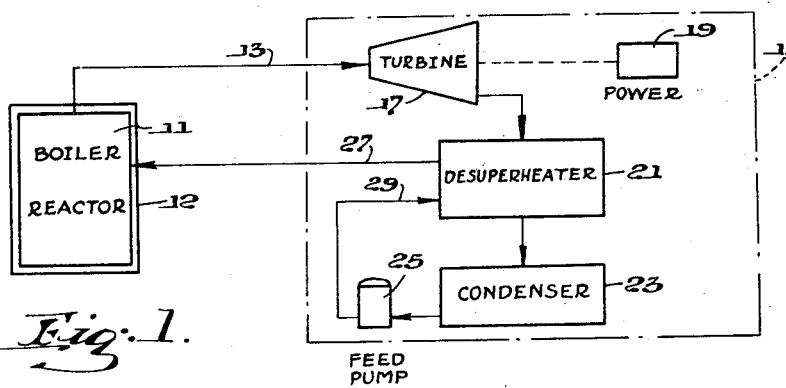
Fig. 1.
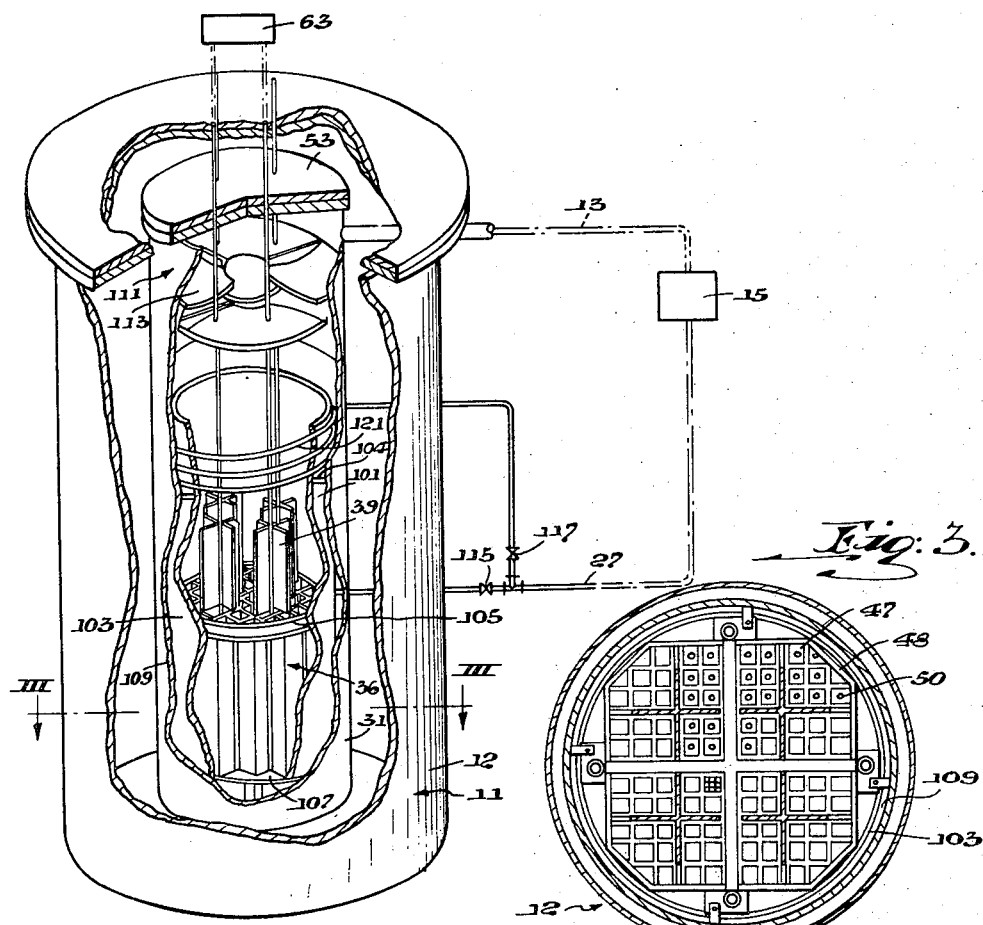
Fig. 2.
Fig. 3.
INVENTOR.
ROBERT B. SPOONER.
BY
C. Daniel Cornish
HIS ATTORNEY.

INVENTOR,
ROBERT B. SPOONER.
BY C. Daniel Cornish
his ATTORNEY

United States Patent Office 3,012,957
Patented Dec. 12, 1961

3,012,957
POWER PRODUCTION SYSTEM
Robert B. Spooner, Pittsburgh, Pa., assignor to Koppers Company, Inc., a corporation of Delaware
Filed June 10, 1959, Ser. No. 819,275
9 Claims. (Cl. 204—193.2)

This invention relates to power production systems and more particularly to nuclear energy power production systems.

In the production of power, as is required in progressive economies, new sources of power have become increasingly important owing to the high cost of transporting conventional fuels such as coal, gas, and oil and owing to the relative unavailability of such conventional fuels in many geographical locations. In many instances it is further desirable that more mobile power producing plants be developed. For example, in connection with military operations, power plants must be moved from place to place to take the fullest advantage of changes in military or political situations. Since it is desirable to move the power plants quickly, they must be fully mobile, dependable, and safe to operate.

Nuclear powered plants have been proposed as one of the best prospects in the international race to develop such power plants. Heretofore, such plants have comprised a nuclear reactor for producing heat, a heat transfer system for taking up and transporting heat produced by the reactor, and a conventional power production unit for converting the transported heat into electrical power.

Heretofore, boiling water reactors were used because of their simplicity. They have comprised a nuclear core and a heat transfer system which circulates water through the core to produce steam. Such reactors, however, had certain disadvantages. They have had elaborate reactor controls. Control rods which were inserted and removed from the reactor core to lower or raise the reactivity of the core have had to have sensitive controls to maintain the reactivity at a relatively constant level so as to severely limit their compactness. The elaborate controls are necessary because water acts as a moderator which keeps neutrons from escaping from the core. The more moderator present in the core, the more neutrons are held in the core to increase the reactivity of the reactor core. As the reactivity increases, the reactor temperature increases to produce more steam but this reduces the amount of moderator so as to tend to shut the reactor down. Moreover, the water has bubbles or steam voids which causes the boiling thereof to be a random fluctuating process resulting in reactivity fluctuations that must be controlled by sensitive and elaborate control systems. Further, a large power demand causes the pressure of the steam in the core to be reduced which causes less moderation in the reactor. This, in turn, causes the temperature of the reactor to be decreased. Since boiling water reactors lack inherent response, it is necessary to have bulky mechanical controls to keep the reactor generating power during a period of increasing power demand. The compactness of the reactors is further limited because large amounts of fuel are required. Moreover, the steam produced in boiling water reactors is saturated and when used to drive turbines, caused pitting in the turbine blades. Additionally, in reactors employing water in the heat transfer system, the oxygen in the water became radioactive for about 4–7 seconds half life. The water caused corrosion products which became radioactive and the radioactivity contaminated the entire system and its auxiliaries before the radioactive materials could be removed by ion exchange.

To obviate the latter disadvantage, a liquid metal such as sodium was used as a reactor coolant. The liquid metal transferred the reactor heat to the water in a separate cycle. This system, however, had the disadvantage of creating a potential hazard of contact of the sodium with the water, particularly since the sodium was radioactive.

This invention provides a simple and yet compact system which avoids the aforementioned disadvantages and practically eliminates radioactivity and corrosion in the heat transfer system. More particularly, this invention utilizes two fluids of different boiling temperatures wherein there is no boiling in the reactor core and substantially no radioactive carryover.

This invention provides for the use of a hydrocarbon as a heat transfer fluid. Since hydrocarbons do not contain oxygen atoms, the heretofore known problems with radioactive oxygen which are encountered when water or steam were used as a heat transfer fluid are avoided.

This invention contemplates an energy system wherein a first fluid, which is a hydrocarbon having a high boiling point, is heated by nuclear energy to an elevated temperature below the boiling point and then contacted with a second fluid whose boiling point is lower than the boiling point of the first fluid whereupon this contact vaporizes the second fluid and cools the first fluid, the cooled first fluid is then recycled to the nuclear energy for reheating, the heat from the vaporized second fluid is utilized whereupon the second fluid is cooled, and thus cooled second fluid is again contacted with the heated first fluid.

The above and further novel features of the invention will appear more fully from the following detailed description when the same is read in connection with the accompanying drawing. It is to be expressly understood, however, that the drawings are not intended as a definition of the invention but are for the purpose of illustration only.

FIG. 1 is a schematic view of one embodiment of the power production system of this invention.

FIG. 2 is a partial isometric and cut away view of FIG. 1.

FIG. 3 is a partial cross section of FIG. 2 taken through III—III.

Figure 4:
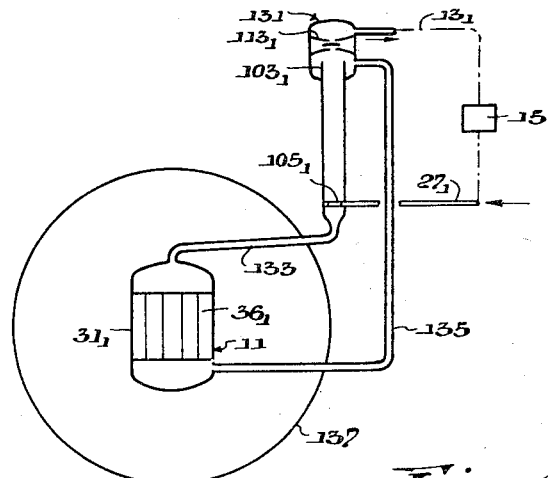
FIG. 4 is a schematic view of another embodiment of the power production system of this invention.

Conventional nuclear energy power production systems have a heat producing reactor core contained in a pressure tight vessel and a control system to control the reactivity of the core. Referring to FIG. 1, nuclear reactor 11, contained in radioactivity shield 12, produces heat which is transferred by line 13 to power production unit 15 comprising a turbine 17, generator 19, desuperheater 21, condenser 23, feed pump 25 and then through line 27 back to reactor 11. Referring to FIGS. 2 and 3, nuclear reactor 11 has a shell 31, core 36 and control rods 39 all of which are conventional. Shell 31, conventionally made of heavy stainless steel, withstands high temperatures and pressures. Core 36 conventionally contains fuel elements 47 of fissionable material, such as uranium, surrounded by a moderator 48 made of scattering material, for example, graphite, magnesium oxide or beryllium oxide. Throughout core 36, passageways 50 provide means for passing heat transfer fluid through core 36 to pick up heat therefrom. Removable cover 53, conventionally made of stainless steel, closes one end of the reactor 11 in a pressure tight manner. Control rod mechanism 63, a conventional mechanical lifting and lowering device, raises and lowers control rods 39 into and out of core 36. The control rods 39, made of steel containing boron or other neutron absorbing material, cause neutron blocking in the reactor when moved in one direction and cause the opposite effect when moved in the opposite direction. Thus, the control rods 39 control neutron absorption and re-emission in core 36 so as to maintain a desired reactor temperature level. Reactor 11 also has means for introducing an initial source of neutron emission (not designated) to initiate a nuclear reaction in core 36 which progresses in a conventional manner.

Conventional boiling water systems which pass water through a core have the advantage of simplicity over pressurized nonboiling water which require elaborate reactors, pumps and much higher pressures but the former have the disadvantages of poor temperature coefficient of reactivity, power demand coefficient of reactivity which is the reverse of what is desired, and lack of compactness and mobility. Furthermore, the reactors which pass water, steam or molten metal through a reactor core have the disadvantage of radioactivity carryover in the heat transfer fluid. This invention embodies the advantage of simplicity and practically eliminates the mentioned disadvantages.

Referring to FIGS. 2 and 3, this invention provides means for taking up in a first heat transfer fluid, that substantially does not become radioactive, the heat produced in the reactor 11, means for transferring heat from said first fluid to a second fluid, and means for carrying said second fluid away from the reactor to power production unit 15 for the generation of power and returning said first and second fluids in a cycle. To this end a first liquid, hereinafter referred to as component A, which has a high boiling point and which does not contain oxygen atoms covers core 36 and fills passageways 50. A nuclear reaction, initiated in core 36, as described above, creates heat which circulates component A through passageways 50 in core 36 by heating component A so as to decrease its density. As the density of component A is lowered by heating, it rises in passageways 50 toward the top of the reactor 11. Thereupon the second fluid, which has a low boiling point and which is hereinafter referred to as component B, is exposed to the rising component A so as to vaporize component B. Simultaneously with the heating of component B, component A is cooled to increase its density whereupon the cooled portion of component A descends to the bottom of reactor 11 and enters passageways 50 to be reheated in a cycle. Meanwhile, component B in a vaporized state at the top of reactor 11 becomes available for transmission through conduit 13 to power production unit 15. Advantageously, after turning turbine 17, component B passes through desuperheater 21, is condensed in condenser 39 and reheated in the secondary side of desuperheater 21 by circulation through conduit 29 and recirculating pump 25. Then component B passes through line 27 directly to reactor 11. The arrangement of power production unit 15 has the advantage that air can be used for cooling in the condenser, however, the arrangement shown for unit 15 is not critical and other conventional arrangements may be used.

In one embodiment, the novel apparatus for the power production system of this invention comprises the combination of a nuclear reactor 11, as described above, and a means for transferring heat from a first fluid to a second fluid in the reactor. Accordingly, in one embodiment, core 36, a substantially cylindrical chimney section 103 made of stainless steel and supported in shell 31 by rods 104, receives component A which after heating in core 36 rises through passageways 50 to chimney 103. Chimney 103 also receives a flow of component B from a distributor 105, comprising pipes having small openings therein. Contact of component B with component A causes the former to vaporize in chimney 103 and simultaneously to cool component A. Component A is cooled thereby to such an extent that substantially all of component A, after rising in chimney 103, flows back to end 107 of core 36 by recirculation through downcomer 109 which is advantageously annular in shape and large enough to prevent any large pressure drop in component A. Component B rises from chimney 103 into the de-entrainment region 111 which may be comprised of staggered baffle plates 113, advantageously made of metal attached to shell 31, by suitable means such as welding. Thereupon residual amounts of component A are further cooled so as to cause recirculation thereof into downcomer 109. Meanwhile, component B becomes available in the de-entrainment region 111 for transmission to power production unit 15 for power generation. It is understood that component B bubbles up in rising in chimney 103 so as to provide thermo-convective circulation of component A.

In operation, the temperature of core 36 is controlled by raising and lowering control rods 39 so that component A in passageways 50 heats substantially without vaporization to a maximum temperature of approximately 700° F. Component B, fed through distributor 105 into chimney section 103, picks up heat from component A as both components A and B rise in chimney 103. The temperature of component A thereupon is lowered and component A flows out of chimney 103 into downcomer 109 from whence recycling into core 36 takes place. Component B meanwhile rises into the de-entrainment region 111 at about 700° F. and flows through conduit 13 to turbine 17 which, by connections to a generator 19, creates power. Thereafter, component B flows through desuperheater 21, condenser 23, pump 25 to the secondary side of desuperheater 21 where it is heated and then through conduit 27 to distributor 105. Desuperheating is carried out advantageously under conditions that prevent any deposit of solid component A. In the condenser, such deposits may occur but the solid component A may be redissolved and passed over the cooling coils of the condenser. The severity of problems of this general nature, however, are substantially reduced because of the possible low pressure operation of this invention. Valves 115 and 117 provide means for controlling the rate of removal of component B from the disentrainment section. Pump 25 and valve 115 control the rate of entry of component B into shell 31 so that the pressure of component B in shell 31 is maintained at a maximum pressure of about 600 p.s.i., or minimum pressure of about 300 p.s.i. The extent to which the cycle pressure can be lowered will be determined by cycle optimization for mobile power use. A small amount of component A will contaminate component B in chimney 103 because of physical contact of the two fluids in chimney 103. The large difference in boiling points, however, will minimize this effect and the disentrainment section will further reduce the amount of component A in component B. A small amount of noncondensable gas generated in the reactor from exposure of component A to a radioactive source, such as core 36, flows into conduit 13. Such noncondensable gas must be removed from component B because it can disrupt the condensation of component B. Accordingly, the noncondensable gas is removed from condenser 23 by an ejector pump (not shown) in a conventional manner to prevent pressure build up in the condenser.

In one embodiment, component A is a high boiling point hydrocarbon, advantageously phenanthrene $C_{14}H_{10}$ which has a boiling point to 340° C. at atmospheric pressure. Component B is a low boiling point medium and must have a thermal efficiency about as good as water to be used in the conventional power production unit 15. Advantageously, toluene $C_6H_5CH_3$, having a boiling point of about 111° C. and a freezing point of −93.2° C., can be used satisfactorily for component B. Toluene, having a low freezing point, can be condensed using ambient air in even the coldest climates. This feature is especially attractive for packed power requirements in Arctic or Antarctic regions where there may be no available condensing water supply.

The apparatus of this invention has a good negative temperature coefficient of reactivity in contrast to that of the boiling water reactor described above. For example, increased temperature in the reactor of this invention has much less of a tendency to shut the reactor down than the same does in the case of the boiling water type reactors because no vapor, which is a poor moderator, is produced in the reactor core of this invention. This invention also has a positive power demand coefficient of reactivity and thus can produce a vaporized heat transfer fluid without the inherent limitations of the boiling water reactor. For example, in accordance with this invention an increase in power demand is felt as a lower pressure and greater flow of component B. The latter tends to cool component A, thus to increase the density of component A. As component A is cooled, it tends to moderate reactivity in core 36, thus to increase the heat output of the core. In contrast, increased power demands on the boiling water reactor tends to shut the reactor down, as described above. The favorable temperature and power demand coefficient of response lend inherent safety to the reactor, thus making it easier to protect the reactor shell against possible pressure vessel rupture. Component B, of course, advantageously exerts a pressure of approximately 600 p.s.i. but there is no large mass of liquid in the reactor to flash into vapor and add to the expansion effect. Only a small amount of component A will change to vapor. The reactor problem thus simplified can include conventional provisions for fire hazard in the use of hydrocarbon materials.

Further, in accordance with this invention, with boiling restricted to a region having little effect on reactivity there are no large reactivity fluctuations as have been experienced with reactors known heretofore. Additionally, there is no burnout problem in the core of this invention similar to that possible when boiling water is used in a core, because there are no steam voids, the steam voids having poor heat transfer characteristics which can cause burnout of the top of the fuel elements in the core of reactors known heretofore. Furthermore, the elimination of steam voids in the reactor makes possible the elimination of bulky and complicated control apparatus and large fuel requirements known heretofore are reduced, all of which make it possible to provide a more compact reactor core.

Also, in accordance with this invention, reactivity of the heat transfer working fluid is less than in reactors which circulate water or steam in the reactor core because of the resistance of component A to reactivity and also because vaporization of component B takes place at a point in reactor 11 removed from core 36. Consequently, this invention practically eliminates the corrosion problems encountered in reactors employing water or steam as a heat transfer working fluid. Furthermore, elaborate water processing equipment is not required. The reduction in corrosion problems makes it possible to use cheaper materials such as carbon steel and aluminum in the reactor and piping systems, therefore also making it possible to make a cheaper and more mobile reactor.

Additionally, the reactor of this invention can utilize heat transfer fluid lines through the reactor shield 12 because the material contained in the lines is not radioactive.

Still further, this invention works efficiently at lower pressures than the boiling reactors known heretofore because the thermodynamic properties of heat transfer fluid B permit lower pressures, higher efficiencies and smaller and simpler turbines.

It is understood from the above that various hydrocarbons remain substantially free of radioactivity when exposed to a source of radioactivity, because they do not contain oxygen atoms. Further, it has been that certain hydrocarbons can be used as heat transfer fluids in a nuclear reactor and passed through the reactor core without becoming radioactive to a very large amount. Such hydrocarbons include naphthalene and terphenyl as well as phenanthrene. Thus, other embodiments of this invention comprise naphthalene or terphenyl as component A.

In another embodiment of this invention, component B comprises benzene, the latter has a lower boiling point than component A. Benzene can be used in a nuclear reactor, as described above, as component B, without becoming radioactive to a very large degree. In still another embodiment, it has been found that water can be used for component B without becoming radioactive to any substantial degree.

In still another embodiment of this invention, component B is preheated before introduction through distributor 105. Advantageously, this is done by carrying component B in coils 121 around chimney 103. This also has the advantage of cooling component A in the downcomer to make component A more dense and to promote circulation thereof.

In a further embodiment, shown in FIG. 4, component B is exposed to component A outside the reactor shell in mixer boiler chamber 131 which, like shell 31, contains a chimney $103_1$ and baffle plates $113_1$. Component B circulates through lines $13_1$ to a power production unit 15 and returns to distributor $105_1$ through line $27_1$. Component A meanwhile circulates in lines 133 and 135 from chamber 131 to core $36_1$ and back to chamber 131. Only liquid lines penetrate the shell $31_1$ and shield 137 which is conventional and substantially impervious to radioactive particles so that the system can be disassembled quickly and maintained easily without radiation hazard.

Figure 5:
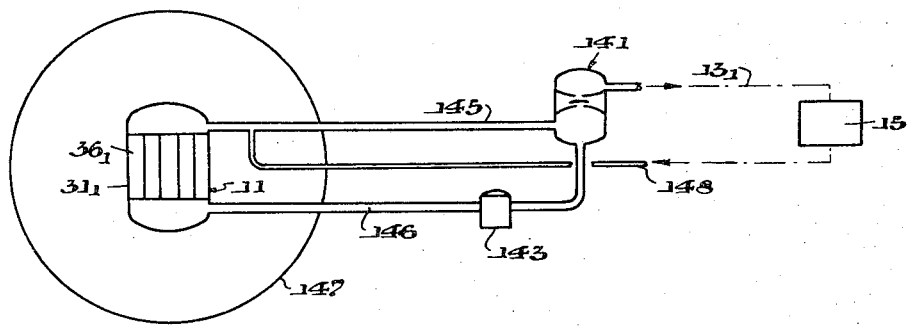
FIG. 5 is a schematic view of still another embodiment of the power production system of this invention.

In a further embodiment shown in FIG. 5, a forced convection system with wrap around mixer-boiler chamber 141 for components A and B is provided as well as a centrifugal demixer and pump 143. Component A is circulated through lines 145 and 146 from chamber 141 to core $36_1$ and back to chamber 141 by means of pump 143. Instead of a chimney, however, component B is mixed with component A in line 145 immediately after coming out of shell $21_1$ and component A is boiled and removed in chamber 141 from component A. Component B then circulates through line $13_1$ to a power unit 15 and back to line 145 through line 148. Only liquid lines penetrate shell $31_1$ and shield 147 which is conventional and substantially impervious to radioactive particles. This embodiment has the advantage that reactivity in the reactor core and the temperature of component B can be changed by changing the amount of component A circulated by pump 143.

This invention has the advantage of providing a compact system and apparatus while substantially eliminating radioactivity in the heat transfer working fluid and corrosion in the piping system, therefore consequently making the system safe and mobile.

What is claimed is:
1. Apparatus for the production of power comprising a nuclear reactor having a heat-producing core contained in a pressure tight vessel, passageways in said core for the flow of a heat transfer working fluid, a chimney in said vessel extending above said core, a first hydrocarbon fluid having a high boiling point filling said vessel to a level sufficiently high to cover said core whereby said first fluid picks up heat from said core and rises in said passageways into said chimney, means for introducing a second fluid having a boiling point lower than the boiling point of said first fluid into said chimney so that said second fluid is vaporized by contact in said chimney with said first fluid and said first fluid is cooled causing said cooled first fluid to recirculate through said core, means for converting heat energy to electric power, means for removing said vaporized second fluid from said vessel to said conversion means whereby it may be used to generate power, and means for condensing and recirculating said second fluid to said chimney.

2. The invention of claim 1 wherein said first fluid is naphthalene.

3. The invention of claim 1 wherein said first fluid is phenanthrene.

4. The invention of claim 1 wherein said first fluid is terphenyl.

5. The invention of claim 1 wherein said second fluid is benzene.

6. The invention of claim 1 wherein said second fluid is toluene.

7. The invention of claim 1 wherein said second fluid is water.

8. A system for the production of power comprising a pressure-tight vessel, a first fluid contained in said vessel, said first fluid being a hydrocarbon with a high boiling point, a second fluid having a low boiling point relative to said first fluid, said second fluid being circulated into and out of said vessel, nuclear energy means disposed in said vessel for heating said first fluid to an elevated temperature below its boiling point, mixing means located above said nuclear energy means in said vessel for mixing the heated first fluid and said second fluid so as to vaporize said second fluid and to cool said first fluid, means for separating the heated first fluid from the vaporized second fluid, means for recycling to said nuclear energy means the first fluid separated from the vaporized second fluid and means for utilizing heat from the vaporized second fluid for producing electric power and means for circulating said second fluid back to said mixing means.

9. A system for the production of power from a heat-producing nuclear energy core contained in a pressure-tight vessel comprising passageways in said core, a first fluid hydrocarbon having a high boiling point adapted to flow in said passageways whereby said first fluid is heated, a second fluid hydrocarbon of low boiling point relative to said first fluid, a chimney in said vessel above said core adapted to receive said heated first fluid, distributing means for introducing said second fluid into said chimney into contact with said first fluid so that said second fluid is vaporized and said first fluid is cooled in said chimney, means for converting heat energy to electric power, means for removing said second fluid from said chimney for circulation through said conversion means and means to return said second fluid to said distributing means, and means for removing said first fluid from said chimney for recirculation in said passageways.

References Cited in the file of this patent

UNITED STATES PATENTS 2,222,575    Schutte _____ Nov. 19, 1940

FOREIGN PATENTS 648,293    Great Britain _____ Jan. 3, 1951

OTHER REFERENCES

Second International Conference on the Peaceful Uses of Atomic Energy, Paper Number A/Conf. 15/P/606, July 1, 1958.

Application of Organic Moderated Reactor to Central Station Power Plants, Weisner et al. Copy in Scientific Library. (12 pages.) 204–154.2 Org. Mod.

Atomic Energy Commission Document: WIAP–M–31, Benzene Turbine Cycles, Beldecos, June 1955, pp. 1–12. Copy in Scientific Library. 204–193.2 Org. Mod.